United States Patent [19]
Nolan

[11] Patent Number: 5,088,365
[45] Date of Patent: Feb. 18, 1992

[54] NOTCHING APPARATUS FOR A DOUBLE CUT DIE SET

[75] Inventor: John H. Nolan, Mt. Clemens, Mich.

[73] Assignee: Alpha Industries, Inc., Novi, Mich.

[21] Appl. No.: 634,777

[22] Filed: Dec. 27, 1990

Related U.S. Application Data

[63] Continuation of Ser. No. 465,416, Jan. 16, 1990, abandoned.

[51] Int. Cl.$^5$ .............................................. B23D 21/00
[52] U.S. Cl. ..................................... 83/300; 74/104; 74/110; 83/54; 83/319; 83/514; 83/519; 83/628; 83/629; 83/917
[58] Field of Search .................. 83/54, 578, 917, 519, 83/300, 514, 319, 629, 632, 628; 74/110, 104

[56] References Cited

U.S. PATENT DOCUMENTS

| | | | |
|---|---|---|---|
| 387,386 | 8/1888 | Whitney | 74/110 |
| 444,016 | 1/1891 | Puetz, Jr. | 74/110 |
| 4,294,147 | 10/1981 | Borzym | 83/382 |
| 4,499,803 | 2/1985 | Borzym et al. | 83/519 X |
| 4,653,368 | 3/1987 | Riera et al. | 83/519 X |

*Primary Examiner*—Mark Rosenbaum
*Assistant Examiner*—Kenneth E. Peterson
*Attorney, Agent, or Firm*—Krass & Young

[57] ABSTRACT

A cut-off die set of the double cut type, in which sections of tubing are successively severed from a length of tubing, utilizing a notching cut followed by a severing cut. A rack and pinion assembly is used to transform the vertical reciprocating motion of the upper and lower platen into the horizintal reciprocating motion used for the notching stroke. The rack and pinion assembly comprises a rack mounted to the upper platen and a gear sector mounted to the lower platen, the gear sector includes a drive roller which engages a cam track on the cross slide. As the upper platen and lower platen are vertically reciprocated, the rack member causes the gear sector to rotate, sliding the drive roller through an arcuate path. Movement of the drive roller through the arcuate path causes the cross slide to move in a reciprocating manner in relation to the reciprocating motion of the upper and lower platens.

21 Claims, 4 Drawing Sheets

NOTCHING APPARATUS FOR A DOUBLE CUT DIE SET

This is a continuation of co-pending application Ser. No. 454,416, filed on Jan. 16, 1990, now abandoned.

FIELD OF THE INVENTION

This invention relates to a tube-cutting apparatus of the type used to sever lengths of tubing or other elongated stock continuously emanating from a fabrication mill. The tube cutting apparatus includes a cut-off die set operated by a ram; the die set is clamped to the tubing prior to the severing operation which is carried out by a vertically reciprocating cut-off blade. A notching mechanism is used in conjunction with the die set to notch the upper periphery of the tubing prior to the severing operation. More particularly, the present invention is a means for reciprocating the notching mechanism relative to the vertically reciprocating cut-off blade.

BACKGROUND OF THE INVENTION

In cut-off systems of the double cut type the tubing is clamped within a set of clamping jaws and a notching blade is reciprocated across the upper periphery of the tubing just prior to the descent of the main cut-off or shearing blade. This prenotching eliminates cusping or dimpling of the tubing, thus subsequent reshaping of the ends of the severed tubing is not required.

In order to notch the tubing, a notching blade mounted to a cross slide is pushed or pulled across the tubing periphery after the tubing is clamped to the die set prior to the descent of the shearing blade. Both push and pull across notching methods are known. See U.S. Pat. Nos. 4,108,029; 4,109,555 and 4,646,601.

In order to translate the vertical reciprocal motion of the upper and lower platens into a horizontal reciprocal motion of the cross slide, a cam, having a curvilinear cam track, is mounted to the upper platen and a cam follower is fixed to the cross slide assembly. As the ram of the cut-off press begins its downward stroke, the cam attached to the upper platen is also forced downward causing movement of the cam follower as it follows the curvilinear cam track. Movement of the cam follower causes the cross slide to complete the notching stroke. Once the tubing is severed by the shearing blade, the ram, operating in a reverse manner, raises the upper platen of the die set. Raising the upper platen causes the cam follower to follow the curvilinear cam track which returns the cross slide to its initial position in preparation for a new cutting cycle. Using the cam/cam follower assembly in this manner allows the reciprocating vertical motion of the platen to be translated into a reciprocating horizontal motion of the cross slide. Cross slide assemblies of this type are known. See U.S. Pat. No. 4,766,792.

SUMMARY OF THE INVENTION

The present invention is directed to a provision for horizontally reciprocating a cross slide assembly in relation to the reciprocal vertical movement of the upper and lower platens of a cut-off die set.

According to the invention, a cut-off die set having upper and lower platens interconnected by guide rods and bushings, which allow for reciprocal movement between the upper and lower platens, utilizes a vertical shearing blade mounted to the upper platen to carry out the severing operation. A cross slide mounted for reciprocal motion is reciprocated by a gear means mounted to one of said platens. A notching blade mounted to the cross slide notches the tubing prior to the vertical shearing cut.

In the preferred form, the gear means comprise a rack and a pinion wherein, the rack is mounted on the upper platen and the pinion is mounted on the lower platen. A drive member mounted to the pinion engages a curvilinear cam track on the cross slide and causes reciprocal movement of the cross slide when the drive member is swung in an arcuate path centered about the rotational axis of the pinion.

DETAILED DESCRIPTION OF THE PREFERRED EMBODIMENT

Figure 1:
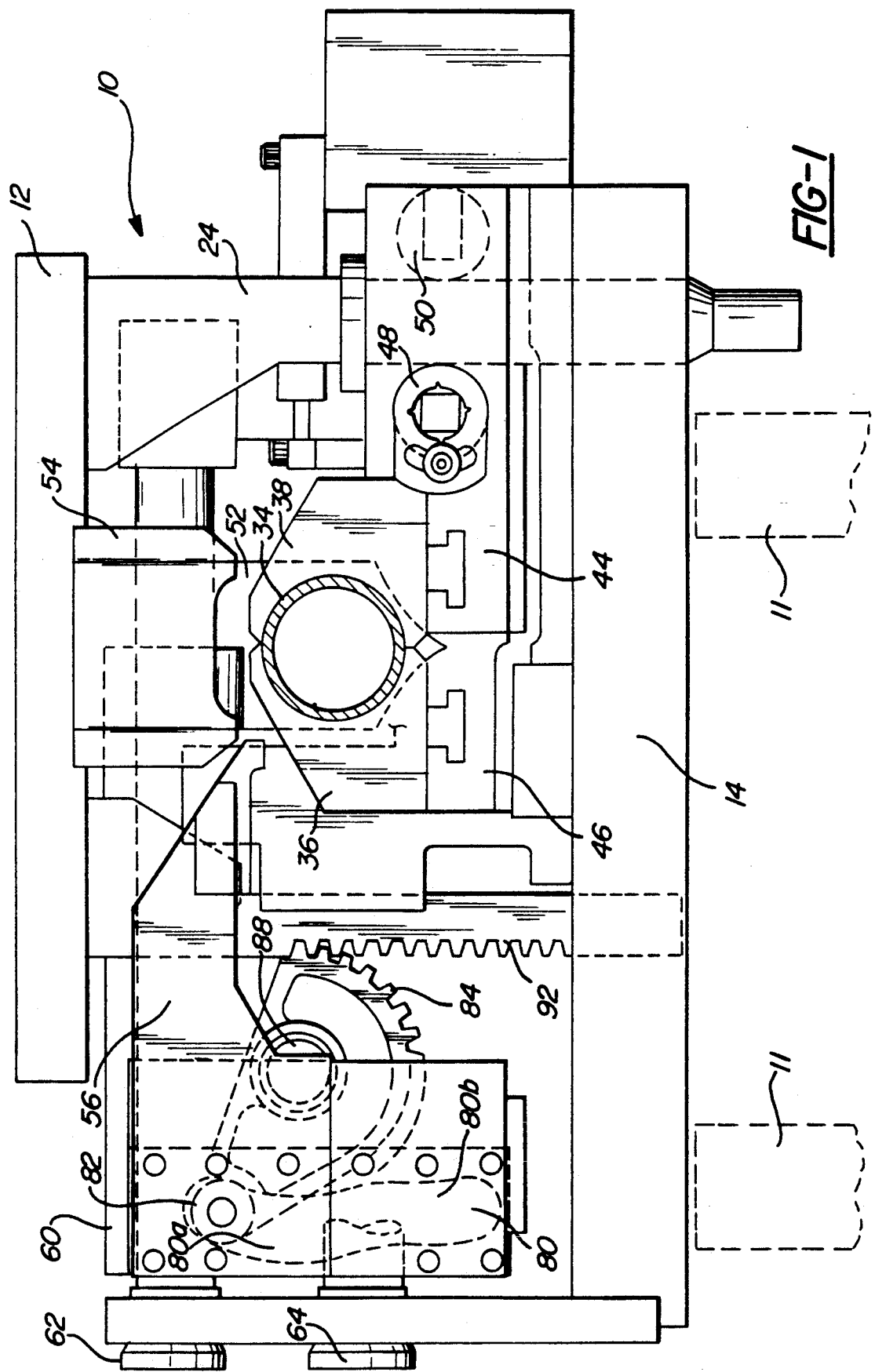
FIG. 1 is a front elevational view of a cut-off die set according to the invention.
Figure 2:
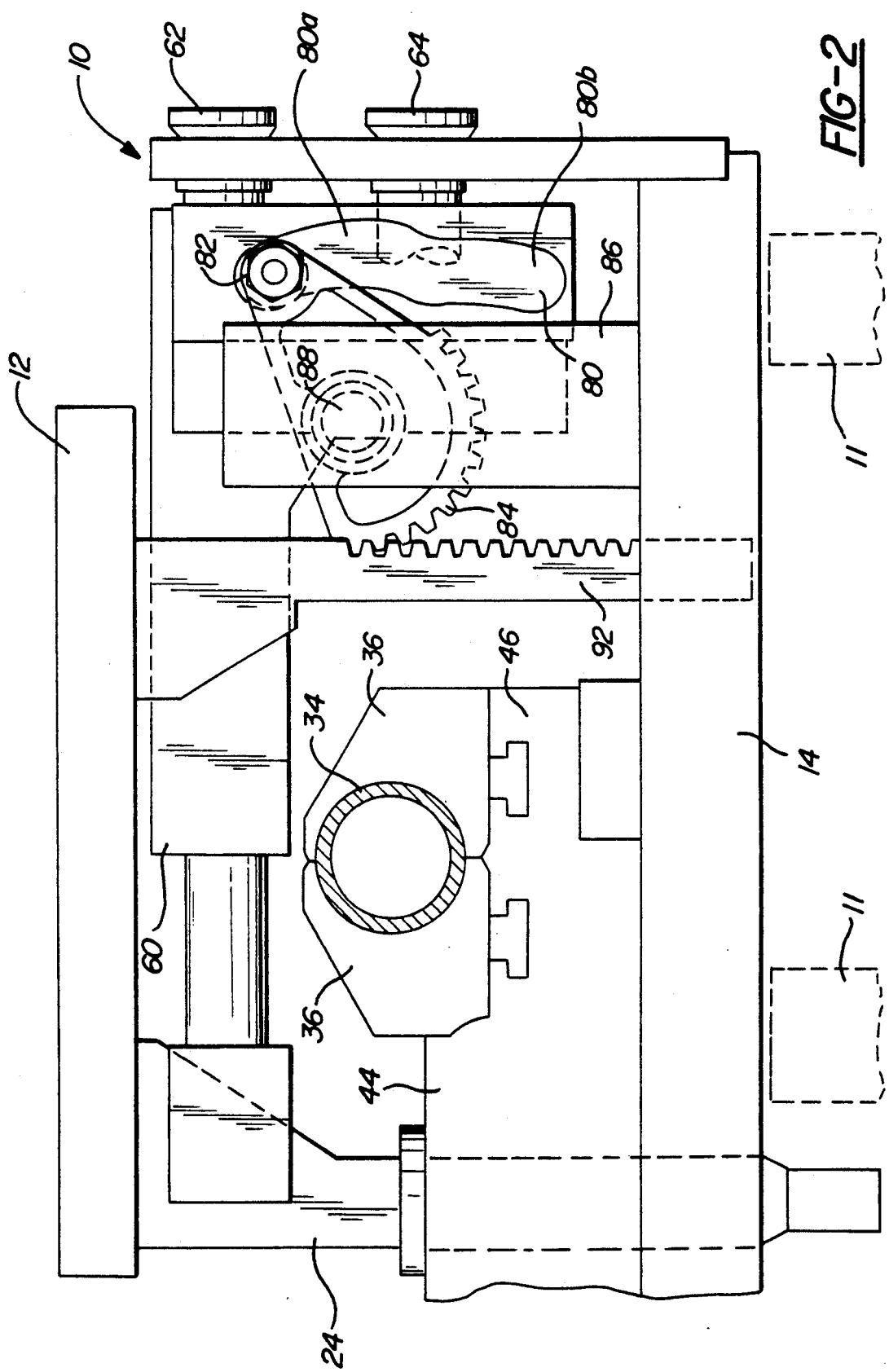
FIG. 2 is a rear elevational view of a cut-off die set according to the invention.
Figure 3:
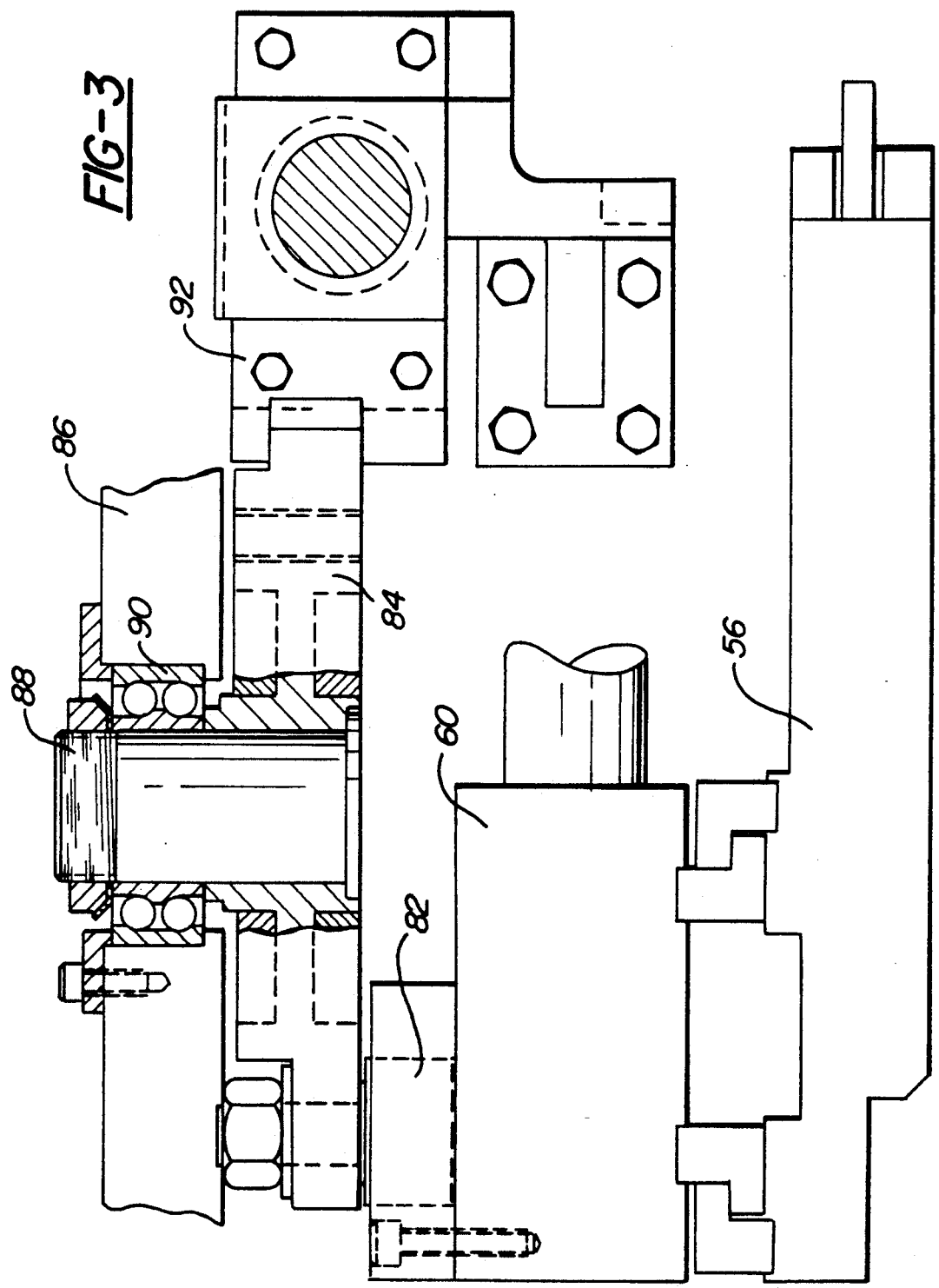
FIG. 3 is a top view of the invention with portions removed for clarity of illustration.

The illustrated cut-off die set 10 is adapted to be employed in a tube-cutting apparatus and is removably mounted to a carriage operating on a set of rails 11 which are part of cut-off press. The cut-off press includes a swinging or reciprocating ram mechanism (not shown) which bears against an upper platen 12 and serves to operate the cut-off die set 10.

In die sets of the general type with which the present invention is concerned, the cut-off die set 10 is positioned to receive the tubing as it emanates from the fabrication mill. The ram mechanism operates to close the clamping jaws within the die set to clamp the die set to the rapidly moving tubing. The die set clamped to the moving tube moves together with the tube along the rails 11. The ram mechanism then causes the notching blade to make a notching cut in the upper periphery of the tubing whereafter the main cut-off or shearing blade is lowered to sever a length from the moving tube. Following the final severing cut, the ram mechanism, then operating in a reverse manner, first causes retraction of the shearing blade and the notching blade, and then unclamping of the die set from the tube section as the cut-off die set approaches the end of its travel on the rails 11. The cut-off die set is then returned to its initial position on the rail set 11 preparatory to initiation of a new cut-off cycle.

The cut-off die set 10 includes an upper platen or shoe 12 and a lower platen or shoe 14. The upper and lower platens 12, 14 are interconnected by a plurality of guide rods and bushings which allow the platens to move with a vertical reciprocating motion in relation to one another. A die jaw cam 24 extends downwardly from the upper platen 12.

As the tubing 34 emanates from the tube forming mill, it is clamped to the die set 10 by means of two pairs of die jaws 36,38. The reciprocal clamping and disengaging movement of the die jaws 36,38 is produced by the sliding movement of an upper die jaw holder 44 and a lower die jaw holder 46. The die clamping jaws 36,38 are adapted to be reciprocated towards and away from each other. The movement of the die clamping jaws 36, 38 is synchronized with the movement of the upper platen relative to the lower platen by action of a die jaw cam 24 passing between a pair of clamping rollers 48,50 carried respectively by the upper die jaw holder 44 and the lower die jaw holder 46. The manner in which cam 24 interacts with the rollers 48,50 to move the die jaws 36,38 into an outer clamping engagement with the tube 34 will not be described further since this mechanism is known and is not part of the present invention. Further details of a mechanism of this type may be found in U.S. Pat. Nos. 4,108,029 and 4,294,147.

Shearing blade 52 is mounted in a blade holder assembly 54 which in turn is secured to the underside and extends downwardly from upper platen 12. Die jaws 36, 38 are spaced apart at 55 relative to the tube axis to provide a slot through which the shearing blade 52 passe during the cutting stroke.

A notching assembly, seen generally at 56, operates to provide a notching cut in the upper periphery of the tube prior to the downward severing movement of the shearing blade 52 so as to preclude the necessity of further work on the end of the severed tube section. The notching assembly 56 is supported on a cross slide 60 assembly wherein an upper guide shaft 62 is positioned over the tubing path and extends from a location on one side of the path to a location on the other side of the path. A lower guide shaft 64 is positioned beneath and parallel to the upper guide shaft 62 and totally on one side of the tubing path. The cross slide 60 is then mounted for reciprocal sliding movement on the guide shafts. The notching assembly 56 is mounted to the cross slide 60 so that the notching blade 66 moves with the cross slide 60 across the tubing path to accomplish the notching operation. Further details of a cross slide mechanism of this type may be found in U.S. Pat. No. 4,766,792.

In the preferred form, applicant's device is a means to reciprocate the cross slide 60 on the guide shafts 62,64 in response to relative vertical movement of the upper and lower platens 12,14. A rack 92 extending downward towards the lower platen 14 is mounted to the upper platen 12.

A gear sector 84 engages the rack 92 and is rotatably mounted, using a pin 88 and bearing 90 assembly, to a bracket 86 secured to the lower platen 14. Attached to the gear sector 84 is a drive roller 82 which swings in an arcuate path about the rotational axis of the gear sector 84. The drive roller 82 engages a curvilinear cam track 80 secured to the cross slide 60.

During the severing operation, the ram mechanism of the cut-off press causes the upper platen 12 and rack 92 to descend. As the rack 92 descends, the interaction between the rack 92 and gear sector 84 causes the gear sector 84 to rotate about the pin 88 and bearing 90 assembly. The rotation of the gear sector 84 causes the drive roller 82 to swing in an arcuate path.

As the drive roller 82 swings in an arcuate path, it interacts with the curvilinear cam track 80 causing the cross slide 60 to be reciprocated on the guide shafts 62,64.

Figure 4:
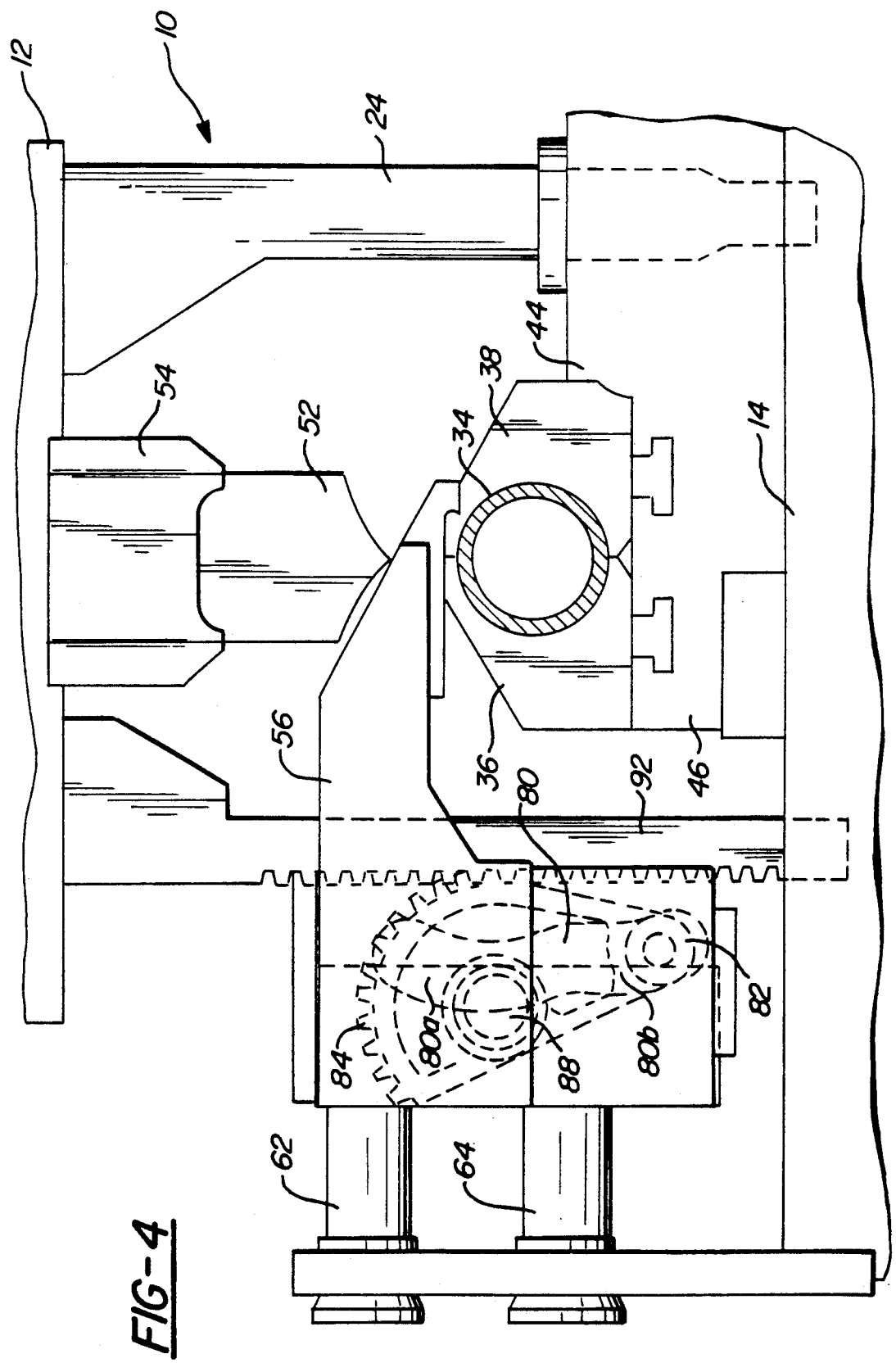
FIG. 4 is a front view of the invention with portions removed for clarity of illustration.

FIG. 4 indicates the initial position of the cross slide prior to the cutting stroke. When the upper platen 12 descends, the interaction of the rack 92 and the gear sector 84 causes the gear sector 84 to be rotated in a clockwise direction. As the gear sector 84 is rotated, the drive roller 82 contacts the edge of the cam track 80 farthest from the tubing 34 causing movement of the cross slide 60 and notching blade 66 on the guide shafts 62,64 in response to the vertical movement between the upper and lower platens 12,14.

As shown, the cam track 80 has upper and lower arcuate portions 80a,80b. During the initial portion of the cutting stroke, the drive roller 82 engages the lower portion 80b of the cam track 80. The length and radius of the lower portion 80b determines the displacement and velocity of the cross slide 60 on the guide shafts 62,64. Once the cross slide 60 and notching blade 66 have traveled the appropriate distance, i.e., the distance necessary for the notching blade 66 to complete the notching cut and remain clear of the path of the shearing blade 52, the drive roller 82 enters the upper portion 80a of the cam track 80. The upper portion 80a of the cam track 80 has an arcuate path having a radius equal to the distance between the drive roller 82 and the rotation axis of the gear sector 84; i.e. the pivot pin 88. Using an arcuate cam track 80 having an upper portion 80a coinciding with the arcuate path of the drive roller 82 allows the drive roller 82 to freely travel in an arcuate path producing a dwell in the horizontal motion of the cross slide 60 during the remainder of the cutting stroke. This dwell is very desirable since it allows the cross slide to move a shorter distance hence shortens the guide rails and thereby stiffens the system.

This arrangement allows both the displacement and velocity of the cross slide 60 to be varied by varying the length and curvature of the upper and lower portions 80a,80b of the cam track 80. The profile of the upper portion 80a of the cam track is designed to produce a dwell period wherein vertical displacement of the upper and lower platens 12,14 results in no horizontal displacement of the cross slide 60. The profile of the lower portion 80b of the cam track 80 has been designed to create a motion profile of the cross slide 60 wherein the notching blade 66 maintains a constant velocity throughout the notching stroke. While the cam track in the preferred embodiment has been designed as stated, the lower portion 80a of the cam track 80 may be designed to fit any equation of motion desired.

While the lower portion 80b of the cam track 80 is shown to be arcuate, the lower portion 80b could be a linear track. However, use of a linear cam track limits the motion profile to a single equation of motion; i.e., the equation for harmonic motion.

After the cutting stroke has been completed, the ram acting in a reverse manner lifts the upper platen 12 which withdraws the shearing blade 52. The upward motion of the upper platen 12 causes the rack 92 to rotate the gear sector 84; this in turn causes the drive roller 82 to swing freely in the arcuate path within the upper portion 80a of the cam track 80. The resultant dwell allows the shearing blade 52 to be withdrawn prior to the return stroke of the cross slide 60. Continued rotation of the gear sector 84 causes the drive roller 82 to engage the lower portion 80b of the cam track 80 which returns the cross slide to its initial position in preparation for the next cut.

The described arrangement for horizontally reciprocating the cross slide relative to the vertical movement of the upper and lower platen will be seen to provide a smooth and efficient transfer of the vertical force supplied to the upper platen of the die set to a horizontal force necessary to pull or push the notching blade across the tubing periphery. Further, the described mechanism for reciprocating the cross slide allows the various movements of the notching blade and shearing blade to be precisely timed thus providing the required clearances between the shearing and notching blade during use of the apparatus.

Although a preferred embodiment of the invention has been illustrated and described in detail, it will be apparent that various changes may be made in the disclosed embodiment without departing from the scope or spirit of the invention. Moreover, the terms vertical, horizontal, upward and downward are used herein in a relative sense and do not suggest any given orientation of the mechanism described when placed into actual use.

I claim:

1. A cut-off die set of a double cut type used to sever sections of an elongated stock comprising:

an upper and lower platen interconnected by a plurality of guide rods and bushings;
a shearing blade mounted on one of said platens;
a cross slide mounted for reciprocal motion on one of said platens;
a cam track located on said cross slide; and
means for mounting a notching blade on said cross slide;
a first toothed member mounted to one of said platens;
a second toothed member meshingly engaging said first toothed member; and a drive member mounted to said second toothed member, said drive member engaging said cam track and operative in response to relative movement between said platens to reciprocate said cross slide.

2. A cut-off die set according to claim 1 wherein said first toothed member comprises a rack and said second toothed member comprises a pinion, said rack being mounted on one platen and said pinion being mounted on the opposite platen.

3. A cut-off die set of a double cut type used to sever sections of an elongated stock comprising:

an upper and lower platen interconnected by a plurality of guide rods and bushings;
a shearing blade mounted on one of said platens;
a cross slide mounted for reciprocal motion on one of said platens;
mean for mounting a notching blade on said cross slide;
gear means for reciprocating said cross slide mounted to one of said platens, said gear means comprises a rack and pinion, said rack being mounted on one platen and said pinion being mounted on the opposite platen; and
a drive member mounted to said pinion engaging a cam track located on said cross slide.

4. A cut-off die set according to claim 20 wherein said pinion gear comprises a gear sector having a drive member mounted on a peripheral edge thereof.

5. A cut-off die set according to claim 4 wherein said cam track comprises a plurality of arcuate portions, one of said portions having a radius equal to a distance from the axis of the pinion to the drive member.

6. A cut-off die set for use in an elongated stock cut-off apparatus of a type including a ram mechanism for operating said cut-off die set, said die set comprising:

clamping means adapted to be operated by the ram mechanism for clamping the stock;
a main cut-off blade;
means operated by the ram for moving said main cut-off blade through the clamped stock to sever the stock;
a notching blade operative when stroked to notch the periphery of a stock preparatory to the severing action of the main cut-off blade; and
a plurality of toothed members meshingly engaged, said toothed members operative in response to movement of the ram to move said notching blade through the notching stroke.

7. A cut-off die set according to claim 6 wherein:
said plurality of toothed members include a rack and pinion.

8. A cut-off die set according to claim 7 wherein:
said die set includes upper and lower shoes movable toward and away from each other in response to operation of the ram mechanism;
said rack is mounted on one of said shoes; and
said pinon is mounted on the other of said shoes.

9. A cut-off die set according to claim 8 wherein:
said rack depends from said upper shoe; and
said pinion is rotatably mounted on said lower shoe.

10. A cut-off die set for use in an elongated stock cut-off apparatus of the type including a ram mechanism for operating the cut-off die set, said die set comprising:

a clamping means adapted to be operated by the ram mechanism for clamping the stock;
a main cut-off blade;
means operated by the ram for moving said main cut-off blade through the elongated stock to sever the stock;
a notching blade operative when stroked to notch a periphery of the stock preparatory to the severing action of the main cut-off blade;
a rotary drive member mounted for rotation about a stationary axis and defining a circumferential drive surface concentric with and centered about said axis;
first means engaging said circumferential drive surface operative in response to operation of the ram to rotate said rotary drive member about said axis; and
second means operative in response to movement of said rotary drive member to move said notching blade through said notching stroke.

11. A cut-off die set according to claim 10 wherein:
said circumferential drive surface includes a series of gear teeth; and
said first means includes a rack meshingly engaging said gear teeth and operative to rotate said rotary drive member about said axis in response to operation of said ram mechanism.

12. A cut-off die set according to claim 11 wherein:
said die set includes upper and lower shoes movable toward and away from each other in response to operation of the ram mechanism;
said rack is mounted on one of said shoes; and
said rotary drive member is mounted on the other of said shoes.

13. A cut-off die set according to claim 10 wherein:
the cut-off die set includes a slide member mounted for movement along a path generally transverse to the path of an elongated stock;
said notching blade is mounted on said slide member; and
said second means comprises a pin mounted to said rotary drive member and a track on said slide member receiving said pin and coating with said pin in response to movement of said pin to move said slide member along said transverse path.

14. A cut-off die set according to claim 13 wherein:
said circumferential drive surface includes a series of gear teeth centered; and
said first means includes a rack meshingly engaging said gear teeth and operative to rotate said rotary drive member about said axis in response to operation of said ram mechanism.

15. A cut-off die set according to claim 14 wherein:
said die set includes upper and lower shoes movable toward and away from each other in response to operation of the ram mechanism;
said rack is mounted on one of said shoes; and
said rotary die member is mounted on the other of said shoes.

16. A cut-off die set according to claim 15 wherein:
said rack depends from said upper shoe; and
said rotary drive member is rotatably mounted on said lower shoe.

17. A cut-off die set according to claim 13 wherein:
said die set includes a guide shaft mounted on said lower die shoe and extending above and generally transversely of the path of the elongated stock; and
said slide member is mounted on said guide shaft.

18. A cut-off die set of a double cut type used to sever sections of an elongated stock comprising:
an upper platen;
a lower platen;
means for connect in said upper platen and said lower platen for reciprocal motion;
a clamp on said lower platen for clamping the stock;
a shearing blade mounted on said upper platen;
a rack mounted on and depending from said upper platen and movable therewith;
arcuate pinion mounted on said lower platen for rotation and engaging the rack to rotate in a direction according to the motion of the rack;
cross cut slide mounted on said lower platen for reciprocal motion in timed relationship with said upper platen; and
means mechanically interconnecting the pinion with the cross cut slide to produce motion of the cross cut slide related to motion of the upper platen according to said timed relationship.

19. A cut-off die set according to claim 18 wherein the mechanical means interconnecting said pinion with the cross cut slide includes a drive member mounted to the arcuate pinion engaging a cam track corresponding located on said cross cut slide.

20. A cut-off die set of a double cut type used to sever sections of an elongated stock including upper and lower platens interconnected for reciprocal motion;
a shearing blade mounted to the upper platen;
a cross slide mounted for reciprocal motion on the lower platen;
a notching blade mounted on said cross slide and a drive means for reciprocating said cross slide in a timed relationship with said upper platen when said drive means comprises a cam track located on said cross slide, said cam track having a compound configuration, said drive means further including a rack and pinion assembly, said rack being mounted on the upper platen and extending downwardly therefrom said pinion being mounted on the lower platen; and
a drive member mounted on said pinion engaging the cam track.

21. A cut-off die set of a double cut type used to sever sections of an elongated stock including upper and lower platens interconnecting for reciprocal motion;
a shearing blade mounted to the upper platen;
a cross slide mounted for reciprocal motion on the lower platen;
a notching blade mounted on said cross slide;
a drive means for reciprocating said cross slide in a timed relationship with said upper platen characterized in that said drive means comprises a first cam, having a follower surface, mounted to said upper platen; a first cam follower contacting said follower surface, mounted to a member pivotally mounted on said lower platen, a second cam follower mounted to said member;
said second cam follower positioned in a cam track located on said cross slide, wherein said cam track has a compound configuration.

* * * * *

UNITED STATES PATENT AND TRADEMARK OFFICE
CERTIFICATE OF CORRECTION

PATENT NO. : 5,088,365
DATED : February 18, 1992
INVENTOR(S) : John H. Nolan

It is certified that error appears in the above-identified patent and that said Letters Patent is hereby corrected as shown below:

Column 3, Line 16, Please delete "passe" and insert -- passes --.

Column 5, Line 53, Please delete "20" and insert -- 3 --.

Column 6, Line 66, Please delete "coating" and insert -- coacting --.

Column 7, Line 30, Please delete "connect in" and insert -- connecting --.

Column 8, Line 22, Please delete "therefrom said" and insert -- therefrom and said --.

Signed and Sealed this

Eighth Day of June, 1993

Attest:

MICHAEL K. KIRK

Attesting Officer

Acting Commissioner of Patents and Trademarks